United States Patent Office 2,998,800
Patented Sept. 5, 1961

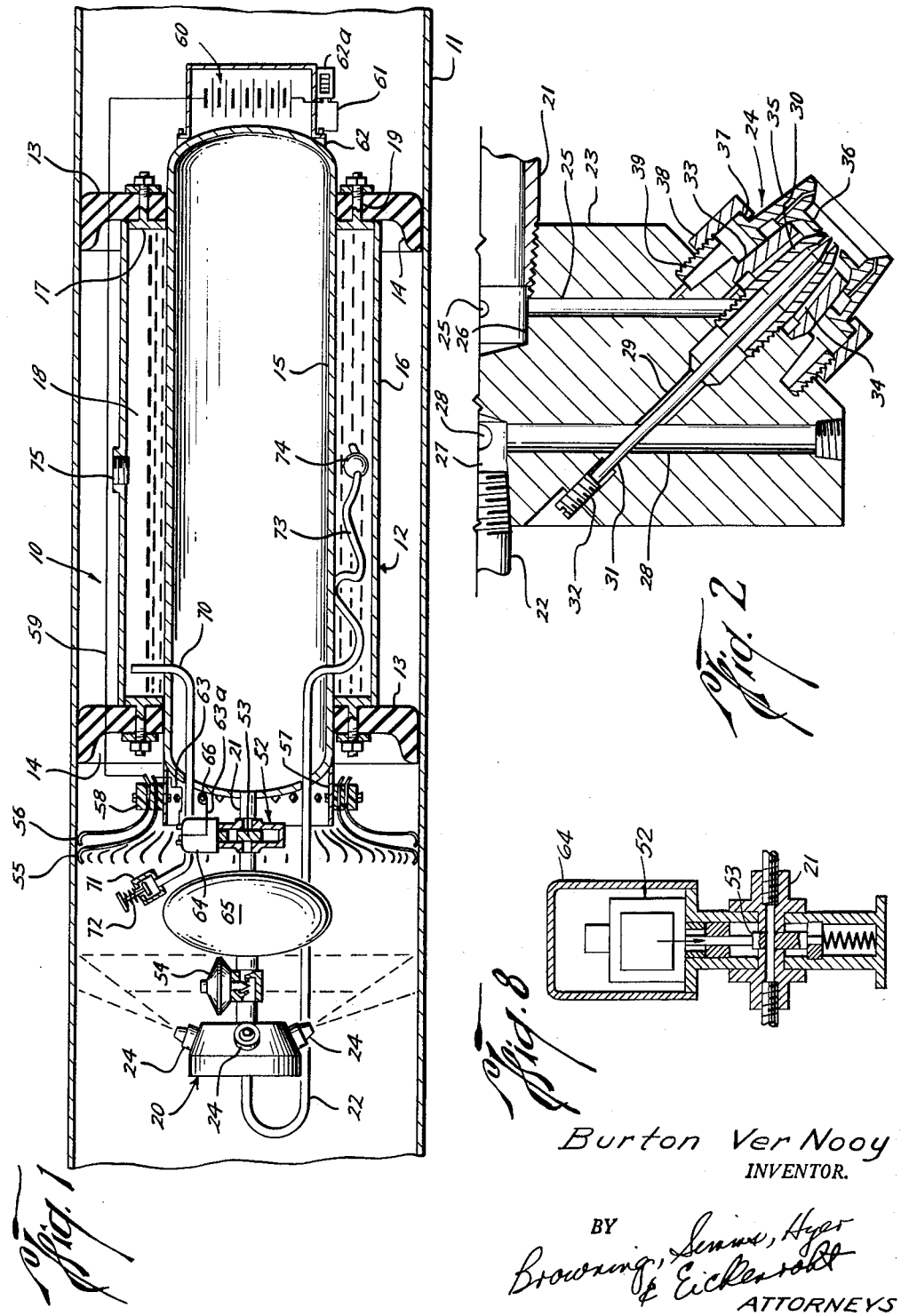

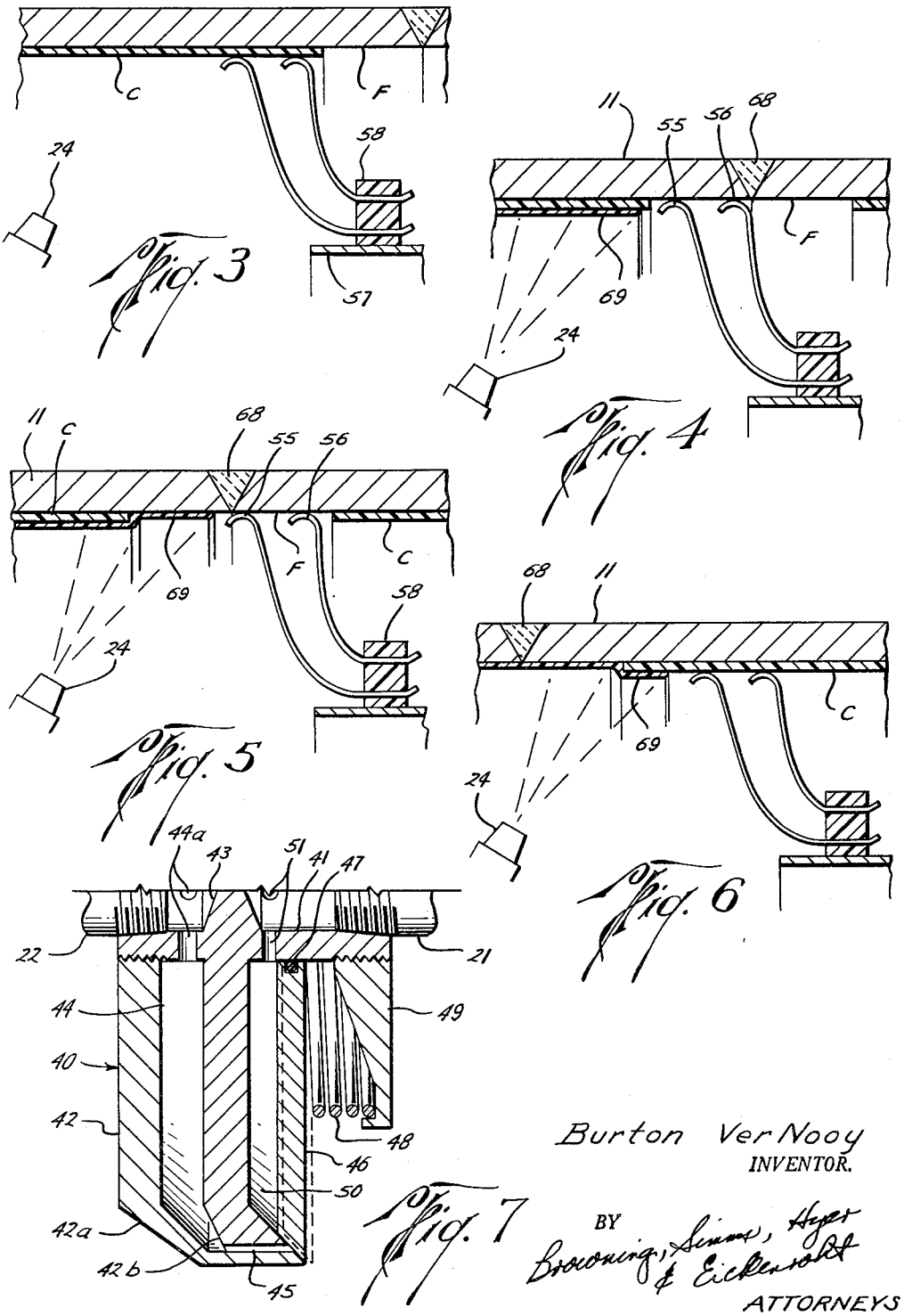

2,998,800
PIPE COATING APPARATUS
Burton Vernooy, Tulsa, Okla., assignor to
T. D. Williamson, Inc., Tulsa, Okla.
Filed Nov. 4, 1958, Ser. No. 771,917
16 Claims. (Cl. 118—8)

This invention relates to apparatus for use in protecting pipelines against corrosion.

It is conventional to coat the inner surface of a pipeline with a corrosion-resisting material either at the factory or in the field. In the former case, either the ends of the individual lengths of pipe are not coated or, if they are, the coating is burned off when the ends are welded together. In the case of field coating, the cleaning of the inner pipeline surface is frequently imperfect such that the coating later falls off with the dirt or rust at these points. Even when the coating is continuous, maintenance work and damage to the outside of the pipe can cause it to be knocked off.

An object of this invention is to provide apparatus for "spot" coating such flaws within a pipeline.

In accordance with this invention, such apparatus comprises a body movable longitudinally through the pipeline and means on the body for detecting and coating a flaw automatically in response to such movement.

Another object of the invention is to provide such apparatus which is self-contained.

A further object is to provide such apparatus which insures full coverage of the flaw regardless of the speed of the body in moving through the pipeline.

A still further object is to provide apparatus of the type above described which will detect flaws of practically all sizes and shapes.

Still another object is to provide apparatus of this type which will detect flaws on inner pipe surfaces of varying diameter.

Yet a further object is to provide such apparatus which provides full circle spray coverage about the pipe.

Yet another object is to provide such apparatus which is simple and compact in construction and which requires a minimum effort to operate.

These and other objects are accomplished by apparatus in which the body includes a container for pipe coating material and a spray head is connected to the container for applying such material to the pipeline. The body also includes a separate container for compressed gas which is also connected to the spray head for withdrawing coating material from its container and expelling it onto the pipe surface.

Annular cups may be mounted about the body to center it within the pipeline and form a sliding seal with the inner surface thereof so that the body may be propelled therethrough by fluid pressure behind the cups.

A plurality of sensing elements are arranged about the body for engaging the pipeline surface as the body moves therepast. These sensing elements comprise an annular row of closely spaced apart spring fingers which are adapted to close an electrical circuit when engaged with flaps on the surface. A normally closed solenoid valve in the connection between the gas container and spray head is disposed in the circuit for opening the connection to begin spraying of the pipeline in response to detection of a flaw.

The resiliency of such sensing elements maintains them in tight electrical contact with the flaw regardless of variations in the pipeline diameter. Also, the close spacing of the fingers enables the detection of small flaws other than those which surround the inner pipe diameter, as at the welded pipe ends.

More particularly, the spray head is arranged to spray coating material onto the pipe surface rearwardly of the flaw, and time delay means are provided for continuing the spray upon disengagement of the spring fingers so as to fully cover the flaw. This delay means may comprise a chamber intermediate the valve and spray head of such volume as to provide a residual supply of compressed gas sufficient to finish the spraying upon closing of the valve.

In the preferred form of the invention, a source of electrical energy is carried by the body and the spring fingers are arranged in two closely spaced apart annular rows so that there is a passage of current between any finger in each row engageable with the flaw and any finger in the other row also engageable therewith at the same time. This enables the detecting means as well as the rest of the apparatus to be self-contained.

In the drawings, wherein like reference characters are used throughout to designate like parts:

FIG. 1 is a side view of the preferred form of the apparatus of the present invention, partly in section, and disposed within a pipeline for movement from left to right;

FIG. 2 is an enlarged sectional view of one-half of the spray head of the apparatus of FIG. 1;

FIG. 3 is an enlarged sectional view of part of the apparatus of FIG. 1, showing a spring finger in each row and a nozzle of the spray head just prior to engagement of the spring fingers with a flaw in the line;

FIG. 4 is a view similar to FIG. 3, but in which the spring fingers have moved into engagement with the flaw to close the electrical circuit and thereby initiate spraying of the inner surface of the pipeline rearwardly of the flaw;

FIG. 5 is a view similar to FIG. 4, but wherein the spring fingers have moved further toward the forward end of the flaw and the spraying of the inner surface of the pipeline has progressed onto the flaw itself;

FIG. 6 is a view similar to FIG. 5, but in which the spring fingers have moved past the flaw, while the spraying has continued so as to fully cover the flaw with coating material;

FIG. 7 is a cross-sectional view of one-half of an alternative form of spray head for the apparatus; and FIG. 8 is an enlarged detailed view of the valve member shown in FIG. 1, but in position to open the connection between a compressed air container and a spray head of the apparatus.

The preferred form of apparatus shown in FIG. 1 is designated in its entirety by the reference character 10 and shown disposed within a pipeline 11 for movement from the right to left. This apparatus includes a body 12 having annular cups 13 of resilient material mounted thereabout and provided with lips 14 for sealing engagement with the inner surface of the pipeline 11. These lips face rearwardly of the body so that it is moved from left to right by means of fluid pressure behind the rear cup. The rigidity of the lips at least substantially centers the body within the pipeline.

Of course, the body 12 may be propelled through the pipeline by other means, such as a line attached to it for pulling from the forward end of the pipeline. In such a case, the body could be mounted on rollers or the like for centering it and facilitating its movement longitudinally of the pipeline. However, the construction shown is preferred from the standpoint of enabling the apparatus to be self-contained.

Still further, the body could also be propelled by other self-contained means, such as an air motor driven by a source of compressed gas or an electric motor driven by a source of electrical power, both to be described hereinafter. Again, however, the embodiment shown is preferred because of its simplicity.

The body 12 includes an inner cylindrical tank 15 for containing a compressed gas and an outer cylindrical body 16 having oppositely disposed closed ends 17 to form an annular tank 18 concentrically of the tank 15 for containing pipe coating material, such as paint. As can be seen from FIG. 1, the inner tank 15 extends beyond the opposite ends of the tank 18, and the cups 13 closely surround the inner tank and are bolted to pins 19 on the ends 17 of the outer tank.

As also shown in FIG. 1, the compressed gas and pipe coating containers are separately connected to a spray head 20 by means of conduits 21 and 22, respectively. As shown in FIG. 2, this spray head includes a main body or manifold 23 having a plurality of nozzles 24 extending outwardly therefrom in a direction to spray coating material onto the inner surface of the pipeline in a pattern shown in broken lines in FIG. 1. More particularly, and as will be more fully understood hereinafter, the construction of the nozzles is such as to provide a substantially conically shaped spray pattern, and the nozzles are so spaced about the manifold as to provide the pipeline surface with full circle coverage.

Referring now to FIG. 2, it will be seen that the conduit 21 from the compressed gas container 15 is threadedly connected to a central passage 26 in the front side of the manifold 23 for communication with the inner end of each of a series of radially outwardly extending ports 25 corresponding in number to the nozzles 24. On the other hand, the conduit 22 extends rearwardly of the spray head 20 and is then turned back on itself for threaded connection with a central passage 27 in the rear end of the manifold from which ports 28 radiate. These latter ports also correspond in number to the nozzles and are disposed in substantially the same radial planes as the ports 25.

The manifold 23 is bored substantially coaxially of the nozzles to provide a plurality of ports 29 connecting at their inner ends with the ports 28 and at their outer ends with inner conduits 30 of the nozzles threadedly connected within counterbored portions in the tapered faces of the manifold. These inner conduits 30 thus provide continuations of the ports 29 for discharging pipe coating material from its container through the conduit 22. The volume of this discharge is controlled by means of a needle 31 threadedly connected at 32 within bores extending into the manifold from the rear of the spray head. Thus, the needle 31 may be adjusted longitudinally to control the area of the annular passage between its outer end and the open outer end of each of the conduits 30.

The inner conduit 30 of each nozzle is surrounded by an intermediate conduit 33 fitted within the outer face of the manifold to provide an annular space 34 communicating with the outer end of each of the ports 25. The intermediate conduit is, in turn, surrounded by an outer conduit 35 of each nozzle having an inwardly projecting annular flange 36 which defines with the outer end of inner conduit 30 a narrow annular passage connecting the annular passage 34 with the nozzle exterior. Thus, as will be obvious from FIG. 2, compressed gas passing from the container 15 and through the conduit 21, port 25 and passage 34 will create a suction about the outlet for the pipe coating material through the outer end of the inner conduit 30 for withdrawing it from its container and expelling it onto the pipeline surface in the manner shown in FIG. 1.

As shown in FIG. 2, the outer conduit 35 is provided with a flange 37 having a tapered inner periphery to fit tightly over the correspondingly tapered outer periphery of intermediate conduit 33. This flange is held in tightly fitting relation about the intermediate conduit by means of an annular ring 38 threadedly connected to a tubular part 39 threadedly received in the manifold.

A nozzle of substantially the same construction as that above described is manufactured and sold by the Binks Manufacturing Company of 3114-40 Carroll Avenue, Chicago 12, Illinois. Obviously, however, other types of nozzles may be used for withdrawing and expelling the pipe coating material from its container onto the body.

In the alternative form of spray head 40 shown in FIG. 7, the conduit 21 also connects with a central passage 41 in the front of a manifold 42, and a conduit 22 connects with a central passage 43 in the rear thereof, similarly to the nozzle shown and described in connection with FIG. 2. However, the manifold 42 of the nozzle 40 is formed of side-by-side, threadedly connected parts 42a and 42b to provide an annular space 44 therebetween which is connected to the passage 43 by means of ports 44a radiating from the passage 43.

The manifold parts also form an annular space 45 which connects with the space 44 at its inner end and whose outer end is normally closed by an annular plate 46 which surrounds a stem of the manifold part 42b. More particularly, this plate forms a sliding seal about the stem by means of an O-ring 47 and is urged into a position closing the space 45, as shown in solid lines in FIG. 7, by means of a spring 48 which acts between the plate and a flange 49 threadedly connected to the aforementioned stem.

This plate 46 also provides an annular space 50 between it and the manifold part 42b which is connected with the central space 41 in the manifold by means of radially extending ports 51. Thus, compressed air or other gas conducted through the conduit 21 and ports 51 into the annular space 50 will force the plate 46 forwardly to the dotted line position to release gas from the space. This rush of compressed gas past the space 45 will withdraw pipe coating material from the container and expel it onto the inner surface of the pipeline as an annular band, as shown in FIG. 1. However, as distinguished from the spray head of FIG. 1, the spray head 40 provides full circle coverage without the need for a plurality of nozzles. Also, of course, the spring 48 regulates the pressure at which the gas escapes.

As shown in FIG. 1, a valve 52 is provided in the conduit 21 for controlling the passage of compressed gas from the chamber 15 to the spray head 20. This valve includes a valve member 53 which is normally closed, as shown in FIG. 1, but which may be moved to open position, in a manner to be described, for admitting the compressed gas to the spray head. A pressure regulator 54 is also disposed in the conduit 21 downstream of the valve 52 for controlling the pressure at which the compressed gas is admitted to the spray head. This regulator may be of any conventional construction, such as the Model RV-01 manufactured by the M & E Manufacturing Company, of Indianapolis, Indiana.

As previously described, the means for detecting a flaw preferably comprises closely spaced apart rows of spring fingers 55 and 56, with the fingers in each row being closely spaced apart circumferentially to detect flaws at substantially any location about the pipe. More particularly, the spring fingers in each row form contacts for closing an electrical circuit in which they are disposed when any combination of one spring in each row is engaged with an uncoated portion or flaw in the pipeline. Furthermore, the resilience of these fingers enables them to maintain contact with the coated and uncoated portions of the pipeline at all times.

As shown in FIG. 1, the inner ends of these spring fingers are mounted on the body in isolated relation to one another as well as the metal parts of the body by means of annular blocks 58 of rubber or other suitable material bolted to a cylindrical extension 57 of the tank 15. Each of the spring fingers 56 in the front row is connected by a conductor 59 to one side of a suitable source of electrical power carried by the body, such as a battery 60 mounted in a housing on the forward end thereof. An electrical conductor 61 connected to the opposite end of the battery is grounded to the tank 15 at 62, and a solenoid-operated counter 62a of conventional construction is connected in the conductor for counting the spotting operations.

Each of the spring fingers 55 of the back row is connected by an electrical conductor 63 to one contact of a solenoid 64 for operating the valve member 53 of the valve 52, and a conductor 63a connects the opposite contact of the solenoid to a ground 66 on the cylindrical extension 57 of the tank 15. Thus, as will be apparent from FIG. 1, the body itself froms a conductor between the grounds 62 and 66, with the solenoid 64 connected in series therewith. Thus, when each of a spring finger 55 and 56 is engaged with a flaw so as to close this circuit, the solenoid is actuated to open the normally closed valve member 53 and thus admit compressed gas to the spray head 20. When, however, the circuit is broken by the movement of one or both of the spring fingers out of engagement with the flaw, the valve member 53 is automatically returned to a position shown in FIG. 1 for closing the conduit 21 to thus shut off the supply of compressed gas to the spray head.

A solenoid-actuated valve suitable for this purpose is manufactured by Barksdale Valves, of 5125 Alcoa Avenue, Los Angeles 58, California; and is shown in detail in FIG. 8.

Although the above-described flaw detecting means is preferred in that it is self-contained, it should be understood that other means may be employed, particularly when the body of this apparatus is propelled by an outside source. For example, such means may comprise a single row of spring fingers connected in a circuit having an exterior source of energy in which the pipeline itself forms a conductor. Also, it is contemplated that the body might be centered and moved longitudinally in the pipeline by means of metal rollers arranged in selected patterns to provide electrical contacts with the pipeline.

As shown in FIG. 1, the spray head 20 is arranged to apply pipe coating material to the pipeline rearwardly of the engagement therewith of spring fingers 55 and 56. Thus, the valve 52 is opened to begin spraying prior to movement of the spray head into position for spraying the flaw itself. On the other hand, the fingers will also disengage from the pipe to permit the valve to close before the flaw is fully covered. To compensate for this, a large reservoir or chamber 65 is disposed in the conduit 21 intermediate the valve 52 and pressure regulator 54, and is of such volume as to accumulate sufficient compressed gas to continue the spraying of the pipeline after closing of the valve 52 so as to cover the entire flaw. Obviously, other means, such as a slow closing valve, may be used for insuring complete coverage of the flaw. It is further obvious that means might also be employed to delay the start of the spraying, although the illustrated embodiment is again preferred due to its simplicity.

FIGS. 3 to 6 show a flaw F of the most conventional type which occurs at the weld 68 between the ends of pipe sections and is annular in shape. As shown in FIG. 3, the pipe coating material is not expelled from the nozzle 24 while both spring fingers 55 and 56 are in engagement with the coated portion C of the pipe because the circuit in which such spring fingers are disposed is open. However, as the fingers move into engagement with the flaw F, they close the circuit to open the valve 52 and expel the pipe coating material onto the inner surface of the pipeline as a coating 69. As previously described, this coating begins rearwardly of the flaw so as to insure its full coverage.

As the spring fingers continue to move forwardly within the pipe and in engagement with the flaw, the circuit remains closed so that the spraying continues until it extends into part of the flaw itself. Even when the spring fingers 55 and 56 move out of engagement with the flaw to open the circuit, the accumulated pressure gas within the chamber 65 is sufficient to continue the spraying operation for such time as is necessary to continue the coating 69 beyond the forward edge of the flaw. When this accumulated pressure gas has been expended, the spraying will stop.

Referring again to FIG. 1, a conduit 70 extends through the tank 15 for communication at its inner end with the container 18 for the pipe coating material and at its outer end with a housing 71 for a spring-pressed valve member 72. As shown, the spring normally urges the valve member to a position for closing the flowway through the conduit. More particularly, the outlet from the valve member is disposed behind the rear cup 13 on the body of this apparatus, so that the pressure of the fluid behind the cup 13 which serves to move the body forwardly will urge the valve member to an open position and flow into the space above the coating material to maintain a desired pressure therein.

As also shown in FIG. 1, a flexible hose 73 is connected at one end to the connection of conduit 22 with the interior of chamber 18, and is provided with a weight 74 at its other end. This insures that the other end of the hose or inlet to the conduit is maintained in the lowest portion of the container 18 despite the rotative disposition of the body during its travel through the pipeline.

The container 18 may be filled with pipe coating material through an opening in one side thereof which is closed by a removable plug 75. Also, the portion of conduit 21 downstream of valve 52 may be removed therefrom and the fingers 55 and 56 short circuited to permit the gas container to be filled.

From the foregoing it will be seen that this invention is one well adapted to attain all of the ends and objects herinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:
1. Apparatus for spot coating flaws on the coated inner surface of a pipeline, comprising a body movable longitudinally through the pipeline, flaw detecting means carried by the body, and means on the body for applying a pipe coating material to the flaw automatically in response to the detection thereof.

2. Apparatus for spot coating flaws on the coated inner surface of a pipeline, comprising a body movable longitudinally through the pipeline and including a container for pipe coating material, means on the body to detect a flaw in the pipeline, and means actuated by said flaw detecting means for applying said material from the container onto the flaw.

3. Apparatus for spot coating flaws on the coated inner surface of a pipeline, comprising a body movable longitudinally through the pipeline, means on the body to engage the pipe for detecting a flaw, means operable in response to said detection for applying pipe coating material to the pipe rearwardly of the flaw, and time delay means for continuing the application of said material, upon disengagement of the detecting means from the flaw, until the flaw is fully covered.

4. Apparatus for spot coating flaws on the coated inner surface of a pipeline, comprising a body movable longitudinally through the pipeline, means on the body for detecting a flaw during movement of said body through said pipeline, a container on the body for pipe coating material, a spray head connected to the coating material container, a container for compressed gas connected to the spray head, means responsive to the detection of a flaw for admitting compressed gas through the second-mentioned connection into the spray head for withdrawing coating material from its container and expelling it onto the pipeline to cover the flaw on the surface thereof.

5. Apparatus of the character defined in claim 4, wherein said containers are arranged concentrically of one another.

6. Apparatus for spot coating flaws on the coated inner surface of a pipeline, comprising a body movable longitudinally through the pipeline, means on the body to engage the pipe for detecting a flaw, a container on the body for pipe coating material, a spray head connected to the coating material container and arranged to spray the pipeline surface rearwardly of the engagement therewith of the detecting means, a container for compressed gas connected to the spray head for withdrawing coating material from its container and expelling it onto the surface, a valve for opening and closing the connection between the gas container and head in response to engagement and disengagement of the detecting means with the flaw, respectively, and means for continuing the spraying of the pipeline upon disengagement of the detecting means so as to fully cover the flaw.

7. Apparatus of the character defined in claim 6, wherein said last-mentioned means includes a large volume chamber intermediate the valve and spray head.

8. Apparatus for spot coating flaws on the coated inner surface of a pipeline, comprising a body movable longitudinally through the pipeline, and a plurality of sensing elements carried by the body for engagement with the pipeline, each forming part of an electrical circuit which is closed upon engagement of at least one of said elements with a flaw, and means on the body for applying a pipe coating material to the flaw in response to closing of said circuit.

9. Apparatus of the character defined in claim 8, wherein the sensing elements are yieldably urged into engagement with the pipeline.

10. Apparatus of the character defined in claim 9, wherein said sensing elements comprise spring fingers.

11. Apparatus of the character defined in claim 8, wherein said sensing elements are arranged to engage about the pipeline in closely spaced apart relation.

12. Apparatus of the character defined in claim 8, wherein said sensing elements are arranged to engage about the pipeline in a pair of closely spaced apart rows, the simultaneous engagement of one element in each row closing the circuit, and including a source of electrical power for the circuit carried by the body.

13. Apparatus for spot coating flaws on the coated inner surface of a pipeline, comprising a body movable longitudinally through the pipeline and including a container for pipe coating material, means on the body for detecting flaws, means including an applicator connected to the container for applying the coating material to the flaws in response to said detection, and a flexible hose connecting at one end with the connection of the container and the applicator and having a weight on the other end for maintaining it at the lower end of said container.

14. Apparatus for spot coating flaws on the coated inner surface of a pipeline, comprising a body movable longitudinally through the pipeline and including a container for pipe coating material, a plurality of sensing elements carried by the body for engagement with the pipeline, each forming part of an electrical circuit which is closed upon engagement of at least one of said elements with a flaw, a spray head connected to the container, another container for compressed gas connected to the spray head for withdrawing coating material from its container and expelling it onto the pipe surface, and a normally closed solenoid actuated valve for opening the connection between the compressed gas container and spray head when the circuit is closed.

15. Apparatus of the character defined in claim 14, wherein the spray head is arranged to spray the pipeline surface rearwardly of the flaw, and including means for continuing spraying upon closing of the valve to fully cover the flaw.

16. Apparatus of the character defined in claim 15, wherein said sensing elements comprise spring fingers arranged to engage about the pipeline in a pair of closely spaced apart annular rows, the simultaneous engagement of one finger in each row closing the circuit, and including a source of electrical power for the circuit carried by the body.

References Cited in the file of this patent

UNITED STATES PATENTS

| | | |
|---|---|---|
| 2,103,134 | Akahira | Dec. 21, 1937 |
| 2,322,228 | De Staebler | June 22, 1943 |
| 2,399,018 | Greenslade | Apr. 23, 1946 |
| 2,573,815 | Smith | Nov. 6, 1951 |
| 2,617,134 | Barton | Nov. 11, 1952 |
| 2,782,370 | Ver Nooy | Feb. 19, 1957 |